United States Patent [19]

Hostettler

[11] 4,156,759

[45] May 29, 1979

[54] POLYURETHANE FOAMS CONTAINING STABILIZED AMYLACEOUS MATERIALS

[75] Inventor: Fritz Hostettler, Freehold, N.J.

[73] Assignee: Krause Milling Company, Milwaukee, Wis.

[21] Appl. No.: 869,439

[22] Filed: Jan. 16, 1978

[51] Int. Cl.² .................. C08G 18/14; C08G 18/64; C13L 1/00
[52] U.S. Cl. ..................... 521/102; 127/71; 260/45.7 PH; 260/45.75; 260/45.75 B; 260/45.75 R; 260/45.75 T; 260/45.85 H; 260/45.85 S; 260/45.85 A; 260/45.85 N; 260/45.95 H; 260/45.95 C; 260/45.95 G; 260/45.95 J; 260/45.95 R; 521/106; 521/117; 521/121; 521/124; 521/126; 521/127; 521/128; 521/129; 521/130; 521/109; 521/175
[58] Field of Search .............. 260/2.5 AE, 2.5 BB, 260/2.5 AN, 2.5 AP, 45.91 R, 45.95, 2.5 AD, 2.5 AM, 2.5 AJ; 530/102; 521/175, 109, 102–106, 121, 124–130; 127/71

[56] References Cited

U.S. PATENT DOCUMENTS

| 2,908,657 | 10/1959 | Boggs ........................... 260/9 |
| 3,004,934 | 10/1961 | Dosmann ................. 260/2.5 AK |
| 3,485,669 | 12/1969 | Kunze ........................... 127/71 |
| 3,956,202 | 5/1976 | Iwasaki ................... 260/2.5 AJ |

FOREIGN PATENT DOCUMENTS 2448216  4/1975  Fed. Rep. of Germany ..... 260/2.5 AJ

*Primary Examiner*—H. S. Cockeram
*Attorney, Agent, or Firm*—Michael, Best & Friedrich

[57] ABSTRACT

Polyurethane foams are prepared by reacting an active hydrogen-containing organic compound with an organic polyisocyanate in the presence of a blowing agent and an amylaceous material which has been stabilized (a) by treating with a stabilizing agent containing an effective amount of an antioxidant capable of inhibiting the formation of oxidation products in the amylaceous material upon exposure to an oxidizing atmosphere or (b) by removing substantially all, or at least a major portion, of the oxidizable materials, particularly fatty acids or fats, from the amylaceous material.

22 Claims, No Drawings

POLYURETHANE FOAMS CONTAINING STABILIZED AMYLACEOUS MATERIALS

BACKGROUND OF THE INVENTION

This invention relates to polyurethane foams containing an amylaceous material, such as a cereal starch or flour, and a process for making same.

Polyurethane foams typically are prepared by reacting one or more active hydrogen-containing organic compounds, particularly polyols such as polyethers and polyhydroxyl-containing polyesters, with a polyfunctional isocyanate in the presence of a blowing agent and, optionally, in the presence of catalysts, stabilizers, surfactants, crosslinking agents, plasticizers, dyes, fillers and pigments. There are four general types of polyurethane foams: (1) rigid, (2) semi-rigid or semi-flexible, (3) flexible, and (4) high resilience. The type of foam produced is determined primarily by the molecular weight and functionality of the active hydrogen-containing organic compound.

Considerable effort has been devoted to reduce the cost of preparing these foams. Towards this end, efforts have been made to employ low cost starches as a reactant to replace a portion of the more expensive polyol or other active hydrogen-containing organic compounds typically employed in the above types of foams. The direction addition of starch along with the other foam-forming ingredients, such as in a "one-shot" process, generally has not been satisfactory because the resultant foams have poor physical properties.

Examples of prior art processes employing starch in polyurethane foams include U.S. Pat. No. 2,908,657 (Boggs) which discloses the incorporation of various starches into a polyurethane foam by adding the starch to a completely reacted liquid reaction product of a polyester and a diisocyanate. Boggs teaches it is essential that the polyester and diisocyanate be mixed and completely reacted before the starch is incorporated; otherwise, the resultant foam product has poor tear resistance and tensile strength. U.S. Pat. No. 3,004,934 (Dosmann et al) discloses the addition of starches to a liquid prepolymer formed by reacting an organic polyisocyanate with a polyether or a polyester to produce foams having predominantly closed cells. German Patent application No. 2,448,216, published Apr. 10, 1975, discloses the use of a carbohydrate filler, such as starch, in polyurethane foams employing a polyisocyanate having a relatively high functionality.

Prior attempts to overcome the difficulties associated with incorporating starches directly into polyurethane foams include using oxyalkylated starches, using polyhydroxypolyoxyalkylene ethers formed by reacting starch with a polyhydric alcohol in the presence of an acid catalyst and then oxyalkylating the resultant reaction mixture as disclosed in U.S. Pat. Nos. 3,227,213 (Fuzesi) and 3,402,170 (Fuzesi et al), and using alkoxylated starch hydrolysates as disclosed in U.S. Pat. No. 3,600,338 (Molotsky).

U.S. Pat. Nos. 3,165,508 (Otey et al), 3,405,080 (Otey et al), and 3,655,590 (Moss et al) disclose the use of starch-based polyols in the production of rigid and flexible polyurethane foams. Attention is also directed to U.S. Pat. Nos. 3,674,717 (Fuzesi et al), and 3,957,702 (Molotsky et al) which disclose the use of phosphorous derivatives of starch polyethers or starch polyether hydrolysates to produce flame retardant polyurethane foams. An article entitled "Rigid Urethane Foam Extended With Starch", in the *Journal of Cellular Plastics,* August 1967, discloses that rigid polyurethane foams containing starch and made with conventional polyethers do not have acceptable physical properties.

Any moisture present in the starch can participate in the polyisocyanate reaction, thereby upsetting the desired balanced stoichiometry between the reactive hydrogen equivalents and the isocyanate equivalents in the foam-forming reaction system with a resultant change in the properties of the final product. Therefore, it is highly desirable to utilize starches which are substantially free of moisture or have been dried to constant moisture level. It has been found that polyurethane foams containing an amylaceous material which has been dried in an oxidizing atmosphere cannot be cured under normal conditions and usually have unacceptably low strength properties. The same phenomenon has been observed for foams containing an amylaceous material, particularly cereal starches and flours, which have been stored for extended time periods under atmospheric conditions.

SUMMARY OF THE INVENTION

A principal object of the invention is to provide polyurethane foams which, although containing an amylaceous material, have curing characteristics and physical properties comparable or superior to conventional foams not including an amylaceous material.

Another object of the invention is to provide a process for preparing polyurethane foams wherein an amylaceous material is incorporated directly into the foam-forming reaction system without adversely affecting the foaming reaction.

A further principal object of the invention is to provide a stabilized amylaceous material which can be stored for extended time periods at ambient temperature and/or dried to a low moisture content prior to incorporation into a polyurethane foams without adversely affecting the foaming reaction.

Other objects, aspects and advantages of the invention will become apparent to those skilled in the art upon reviewing the following detailed description and the appended claims.

In accordance with the invention, an amylaceous material to be incorporated into a polyurethane foam prepared by reacting an active hydrogen-containing organic compound with an organic polyisocyanate and a blowing agent is stabilized prior to introduction into the foam-forming reaction mixture. More specifically, the amylaceous material is stabilized (a) by treating with a stabilizing agent including an effective amount of an antioxidant capable of inhibiting the formation of oxidation products in the amylaceous material upon exposure to an oxidizing atmosphere or (b) by removing substantially all, or at least a major portion, of the oxidizable and/or oxidized materials from the amylaceous material. About 5 to about 90 parts by weight of the stabilized amylaceous material per 100 parts of the active hydrogen-containing organic compound is added as an ingredient of the reaction mixture.

The stabilizing agent can include one or more primary antioxidants of the free radical scavenger type which act to terminate propagation of chain reactions which accelerate the oxidation process, such as hindered phenolic antioxidants, polyhydroxy phenolic antioxidants, and secondary amine antioxidants. The stabilizing agent also can include one or more primary antioxidants in combination with a secondary antioxidant of the reducing type which is capable of breaking down or decomposing the oxidation products, such as organophosphites, esters of thiopropionic acids, thiocarbamates, and dithiocarbamates. The oxidizable and/or oxidized materials, particularly fatty acids or fats, can be removed from the amylaceous material by solvent extraction with an alcohol, a hydrocarbon solvent, or a halogenated hydrocarbon solvent which will not fractionate starch.

The stabilized amylaceous materials can be incorporated into various polyurethane foams, including rigid, semi-rigid or semi-flexible, flexible and high resilience foams, without deleteriously affecting the foaming or curing characteristics thereof. The physical properties of the resultant foams are comparable to, and in some respects superior to, those of conventional polyurethane foams even though a substantial portion of the more expensive active hydrogen-containing organic compound is replaced with a low cost amylaceous material.

DESCRIPTION OF THE PREFERRED EMBODIMENTS

As mentioned above, an amylaceous material stabilized in accordance with the invention can be incorporated into rigid, semi-rigid or semi-flexible, flexible and high resilience polyurethane foams. These foams are prepared by reacting an active hydrogen-containing organic compound with an organic polyisocyanate in the presence of a blowing agent and, optionally, in the presence of catalysts, stabilizers, surfactants, cross-linking agents, plasticizers, dyes, fillers and pigments. The basic difference between the polyurethane foams of the invention and conventional foams is that a portion of the active hydrogen-containing organic compound is replaced with a stabilized amylaceous material.

The foaming ingredients can be combined and reacted in a single step by the so-called "one-shot" technique. Alternately, the active hydrogen-containing compounds can be reacted with an excess amount of the polyisocyanate in a first step to form a prepolymer which contains free isocyanate groups and subsequently reacted in a second step with water to produce the foamed product.

Generally, any active hydrogen-containing organic compound known to react with organic polyisocyanates in the presence of a blowing agent to produce polyurethane foam products can be used. Representative hydrogen-containing groups include —OH, —COOH, —NH$_2$, —SH, =NH, —CSNH$_2$, —CONH$_2$, —SO$_2$NH$_2$ and —SO$_2$OH. Suitable active hydrogen-containing compounds include polyols, such as polyhydroxyl-containing polyesters, polyoxyalkylene polyethers, polythioethers, polyhydroxyl-containing phosphorous compounds, and polyacetals; polyamines; polyamides; and polystearamides. Polyhydroxyl-containing polyesters and polyoxyalkylene polyethers generally are preferred with polyoxyalkylene polyethers being the most preferred because of their lower cost.

The polyoxyalkylene polyethers employed are well known. They can be either linear or branched and usually have a molecular weight of about 200 to 8000. The particular polyether used depends to a large extent upon the type of foam being made. As is well known, polyethers having molecular weights at the lower end of the above range, e.g., about 200 to about 1000, and having a functionality of about 3 to about 8 are used to prepare rigid foams while polyethers having molecular weights at the upper end of the above range, e.g., about 4000 to about 8000, and having a functionality of about 2 to about 3, are used to prepare high resilience foams. Intermediate molecular weight polyethers usually are used to prepare semi-rigid or semi-flexible foams and flexible foams.

Particularly suitable polyethers include linear or branched alkylene oxide adducts of polyhydric alcohols. Suitable alkylene oxides include ethylene oxide, propylene oxide, butylene oxide, styrene oxide, amylene oxide and homo or block copolymers of these alkylene oxides. Suitable polymerization initiators include ethylene glycol, diethylene glycol, glycerol, trimethylolpropane, triethanolamine, diethylene glycol, ethylenediamine, phenol formaldehyde condensation products, aniline-formaldehyde condensation products, pentaerythritol, sorbitol, sucrose, and the like. Grafted polyethers or so-called "polymer/polyols" including a vinyl polymer, such as polyacrylonitrile and polystyrene, grafted to a polyether backbone can be used.

The preferred polyethers are homo and block copolymers of propylene oxide and another alkylene oxide and most preferably are block copolymers of propylene oxide and ethylene oxide with the ethylene oxide being the outer block. The preferred grafted polyethers include vinyl polymers grafted to this type block copolymer. High resilience foams commonly are prepared from a blend of an ethylene oxide-propylene oxide block copolymer and a graft polyether. It has been found that the major portion or all of the graft polyether can be replaced with an amylaceous material stabilized in accordance with the invention.

The polyethers may contain primary and secondary hydroxyl groups. For molded semi-flexible, flexible and high resilience foams, preferably, at least 50%, and most preferably at least 60%, of the terminal hydroxyl groups are primary. The equivalent weight per hydroxyl group generally is within the range of about 70 to about 2500. The equivalent weight per hydroxyl group usually is as low as 70 up to as high as 200 for rigid foams, about 750 to about 2500 for flexible and high resilience foams, and about 300 to about 1800 for semi-flexible foams.

The polyesters can be any suitable linear or branched polyester, particularly alcoholic hydroxy-terminated polyesters obtained by the reaction of a polycarboxylic acid, such as adipic acid, succinic acid, glutaric acid, sebacic acid, phthalic acid, isophthalic acid, terephthalic acid and the like, and a polyhydric alcohol, such as ethylene, diethylene or triethylene glycol, propylene glycols, butylene glycols, pentane diols, neopentylene glycol, glycerol, trimethylolpropane, pentaerythritol, sorbitol, and the like. A typical polyester for flexible foams is produced from an aliphatic acid, such as adipic acid, diethylene glycol, and a small quantity of trimethylolpropane. A typical polyester for rigid foams is produced from a mixture of aliphatic and cyclic acids, such as adipic and phthalic acids, and a triol, such as glycerol or trimethylolpropane. As used herein, the term "polyester" includes polyester amides produced by including an amine, such as ethylene diamine, or an amino carboxylic acid in the reaction mixture.

Polyhydroxyl-containing phosphorus compounds which can be used as the active hydrogen-containing organic compound include those disclosed in U.S. Pat. No. 3,639,542.

Suitable polyacetals which can be used as the active hydrogen-group containing organic compound or condensed with alkylene oxides to form a polyol include reaction products of an aldehyde, such as formaldehyde, paraldehyde, butyraldehyde and the like, with one of the polyhydric alcohols mentioned above for the preparation of polyesters.

Suitable polyamines which can be used as the active hydrogen group-containing organic compound include ethylene diamine, 2,4-diaminotoluene, ethanolamine, piperazine, and the like.

Suitable polyamides include linear polymers having repeating carbodiamide groups as an integral part of the polymeric chain, e.g., a polycarboxylic acid and a polyamine, such as dicarboxylic acid and an alkylene diamine. Also, the polyamides can be prepared by the condensation polymerization of lactams.

Suitable amylaceous materials include high starch-bearing fractions of various cereal grains and tubers, such as corn, rice, wheat, barley, sorghum, potato and tapioca; and waxy and high amylose varieties of corn, sorghum, wheat, and the like. The amylaceous material can be in the form of a dry milled or wet milled product, such as a flour or a starch. It can be used in unmodified form or modified by treatment with acids, alkalis, and enzymes or with oxidizing, etherifying or esterifying agents. Also, it can be thermally modified to produce pregelatinized starches and flours or to produce dextrins and the like. Pregelatinized amylaceous materials, which are particularly suitable, include products produced from starches and flours on extruder-cookers, steam rolls, gas-fired rolls and the like. These pregelatinized products can be used without further treatment or modified with an acid or other modifying agents such as those disclosed in U.S. Pat. No. 3,983,084.

In amylaceous materials which have not been modified, a number of the hydroxyl groups present in the starch granule are bound in highly crystalline regions and, apparently for this reason, are not capable of rapidly reacting with isocyanate groups. Foams prepared with pregelatinized amylaceous materials generally have been found to have superior curing characteristics and physical properties. While not completely understood at this time, it appears that pregelatinized amylaceous materials are more reactive because more hydroxyl groups are made accessible for reaction by virtue of the swelling and rupturing of the starch granule which occurs during the gelatinization process. Accordingly, pregelatinized amylaceous materials presently are preferred, with pregelatinized cereal starches and flours being the most preferred.

The amount of amylaceous material used can be within the range of about 5 to about 90, preferably about 20 to about 60, and most preferably about 30 to about 45, parts by weight per 100 parts of the active hydrogen-containing organic compound used in the foam-forming reaction system. The final foam product contains about 3 to about 35, preferably about 10 to about 25, and most preferably about 15 to about 20, weight % of the amylaceous material, based on a total weight of the foam.

The amylaceous materials usually contain some quantity of moisture which can vary over a relatively broad range depending on the source of the particular amylaceous material, the type of processing, atmospheric conditions during storing, transportation and handling, etc. Moisture present in the amylaceous material can participate in the foaming reaction and cause a non-uniform foaming rate which can adversely affect the physical characteristics of the final foam product. Accordingly, it is highly desirably to use amylaceous materials which are substantially free of moisture in order to obtain a reaction system having a predeterminable balanced stoichiometry of isocyanate equivalents and the reactive hydrogen equivalents which will produce a final foam having the proper balance of these equivalents.

To meet this desideratum, the moisture content of the amylaceous material preferably is adjusted downwardly to less than about 1 weight % prior to introduction into the foam-forming system. This can be conveniently accomplished by employing a suitable drying technique, such as vacuum drying, flash drying, spray drying or drying in air at a temperature of about 100 to about 120° C. for about 6 to about 24 hours or until a constant weight is obtained.

As mentioned above, it has been found that many amylaceous materials, particularly cereal starches and flours, contain oxidation products which interfere with the foam-forming reaction after being stored for some time at ambient conditions or dried in an oxidizing atmosphere. Corn starches and flours and other cereal products typically contain polysaccharides, proteins and fats. Some portion of the cereal product apparently is oxidized to form oxidation products, such as hydroperoxides, peroxides, ozonides, etc., which tend to interfere with the foam-forming reaction. Whether these oxidation products are formed predominantly from the fatty acid portion of the cereal product or also formed partly from the protein or carbohydrate fractions is not completely understood at this time. In any event, polyurethane foams incorporating an amylaceous material containing oxidation products frequently cannot be cured under normal conditions and often have very poor physical properties.

In accordance with the invention, this problem is minimized by stabilizing the amylaceous material against oxidation prior to drying. Such stabilization is effected by treating the amylaceous material with a stabilizing agent including an effective amount of one or more antioxidants capable of inhibiting the formation of oxidation products or, alternatively, by removing substantially all, or at least a major portion, of the oxidizable and/or oxidized materials, particularly fatty acids or fats, contained by the amylaceous material. The use of a stabilizing agent is presently preferred because of the lower processing costs.

Suitable antioxidants for use as the stabilizing agent include those which act as free radical scavengers and those which act more like a reducing agent and break down or decompose oxidation products. The first type of antioxidants act primarily to terminate the propagation of chain reactions which accelerate the oxidation process. That is, they serve to minimize the formation of hydroperoxides, peroxides, ozonides and similar products which tend to interfere with the foaming reaction and, thus, are referred to herein as primary antioxidants. The second type of antioxidants are more effective in breaking down or decomposing hydroperoxides, peroxides, ozonides and similar oxidation products into hydroxyl compounds, aldehydes, acids, etc., which generally do not interfere with the reaction and, thus, are referred to herein as secondary antioxidants. Stabilizing agents including a mixture of primary and secondary antioxidants have been found to be particularly effective and presently are preferred.

Suitable primary antioxidants include conventional antioxidants known to be free radical scavengers such as phenolic antioxidants, both hindered phenolics and polyhydroxy phenolics, and secondary amines.

Representative examples of suitable hindered phenolic antioxidants include alkylated phenols, such as butylated hydroxytoluene (2,6-di-tert-butyl-p-cresol), butylated hydroxyanisole (15% 2-tert-butyl-4-hydroxyanisole and 85% 3-tert-butyl-4-hydroxyanisole), 2,6-di-tert-butyl-4-hydroxymethylphenol, and 2,6-di-tert-butyl-4-stearylphenol; alkylidene bisphenols, such as 2,2'-methylene-bis-(6-tert-butyl-p-cresol), 2,2'-butylidene-bis-(6-tert-butyl-m-cresol), 4,4'-butylidene-bis-(6-tert-butyl-m-cresol), 4,4'-cyclohexylidene-bis-(2-cyclohexylphenol), 4,4'-methylene-bis-(2,5-di-tert-butylphenol), and 2,2'-methylene-bis-6-(1-methylcyclohexyl)-p-cresol; thiobisphenols which are the reaction products of sulfur chloride and alkylated phenols, such as 4,4'-thio-bis (6-tert-butyl-m-cresol), thio-bis-(di-sec-amyl phenol) and the reaction product of 6-tert-butyl-m-cresol and sulfur chloride; polyphenols, such as 1,1,3-tris-(2-methyl-4-hydroxy-5-tert-butylphenyl) butane, tetrakis [methylene (3,5-di-tert-butyl-4-hydroxy cinnamate)] methane, 1,3,5-trimethyl-2,4,6-tris (3,5-di-tert-butyl-4-hydroxybenzyl) benzene, di-(3,5-di-tert-butyl-4-hydroxybenzyl) ether, di-(3,5-di-tert-butyl-4-hydroxyphenol) methane, 2,4,6-tri(3',5'-di-tert-butyl-4-hydroxybenzyl) phenol, 2,4,6-tri(3',5'-di-tert-butyl-4'-hydroxybenzyl) mesitylene; thiodiethylene bis-(3,5-di-tert-butyl-4-hydroxy) hydrocinnamate; and the tocopherols.

Representative examples of suitable polyhydroxy phenolic antioxidants include esters of gallic acid, such as propyl gallate, octyl gallate, and dodecyl gallate; nordihydroguaiaretic acid (2,3-dimethyl-1,4-bis (3,4-dihydroxyphenyl) butane); 2,4,5-trihydroxybutyrophenone; p-tert-butyl cathechol, cathechol, and the like.

Representative examples of suitable secondary amines include diphenylamines, such as octyl diphenylamine; phenylenediamines, such as N-isopropyl-N'-phenyl-p-phenylenediamine; alkylenediamines, such as N,N'-diphenylethylenediamine; and naphthylamines, such as phenyl-$\beta$-naphthylamine and beta-methyl naphthylamine.

Other suitable free radical scavenger antioxidants include gum guaiac and ethoxyguin.

Suitable secondary antioxidants include organophosphites or alkylated aryl phosphites, particularly alkylated phenol phosphites such as (tris) nonyl phenyl phosphite and hindered phenol phosphites, esters of thiopropionic acids, such as dilaurylthiodipropionate, thiocarbamates, dithiocarbamates, and the like. Dilaurylthiodipropionate has been found to be particularly effective and presently is the preferred secondary antioxidant.

The stabilizing agent, either one or more primary antioxidants alone or a mixture of primary and secondary antioxidants, is admixed with the amylaceous material in a suitable manner. For example, the antioxidant(s) can be dissolved in a suitable solvent which does not fractionate or otherwise deleteriously affect the starch portion of the amylaceous material and the resultant solution thoroughly admixed with the anylaceous material in conventional blending equipment. Suitable solvents include alcohols, such as methanol, ethanol and isopropanol (but not butanol and other alcohols which fractionate starch); ketones, such as methyl ethyl ketone; hydrocarbons, such as hexane, pentane, heptane and pentene; and halogenated hydrocarbons, such as methylene chloride, ethylene chloride and the like.

Alternately, the antioxidant(s) can be dry blended with the amylaceous material in conventional blending apparatus, such as a Waring blender, a ribbon blender or a high intensity blender.

The amount of stabilizing agent admixed with the amylaceous material varies depending on the particular amylaceous material being treated so long as an effective amount of the antioxidant(s) is added to inhibit the formation of any appreciable amount of oxidation products in the amylaceous material upon exposure to an oxidizing atmosphere during drying or storage prior to drying. Generally, the amount of the antioxidant(s) can vary from a few parts per million up to 1 weight % or more, based on the total weight of the amylaceous material prior to drying. The amount of stabilizing agent used, as the weight of antioxidant(s), preferably is about 0.03 to about 0.6, most preferably about 0.1 to about 0.5, weight %, based on the total weight of the amylaceous material prior to drying. When a mixture of primary and secondary antioxidants is used, the proportion of the primary antioxidant usually is less than the secondary antioxidant.

As mentioned above, the anylaceous material also can be stabilized by removing substantially all, or at least a major portion, of the oxidizable and/or oxidized materials, particularly fatty acids or fats. This can be conveniently accomplished by extracting the oxidizable and/or oxidized materials with a suitable organic solvent which does not fractionate or otherwise deleteriously affect the starch portion of the amylaceous material. Suitable solvents for this purpose include those mentioned above for use in the stabilizing agent.

After the amylaceous material has been stabilized, either by treatment with a stabilizing agent or by removal of the oxidizable and/or oxidized materials, it can be dried to the desired moisture content for use in the foam-forming reaction system. If the dried stabilized amylaceous material is not to be used within a relatively short period of time after drying, it should be stored in a moisture-tight container or package for future use. As indicated above, the undesirable oxidation products can be formed during prolonged storage of amylaceous materials under atmospheric conditions. Accordingly, the amylaceous material should be stabilized at the earliest possible stage of processing so long as it is before drying. For example, when a pregelatinized cereal starch or flour is used, the stabilizing agent can be admixed therewith prior to the gelatinization process or within a relatively short time thereafter prior to storage.

The organic polyisocyanate employed can be aromatic, aliphatic, and cycloaliphatic polyisocyanates. Aromatic polyisocyanates are preferred. Representative examples of suitable polyisocyanates include diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate; the triisocyanates such as 4,4', 4''-triphenylmethane triisocyanate, polymethylene polyphenylisocyanate and toluene, 2,4,6-triisocyanate; and the tetraisocyanates, such as 4,4'-dimethyldiphenylmethane-2,2', -5,5'-tetraisocyanate.

Crude polyisocyanates can be used, such as crude diphenylmethane diisocyanate and derivatives thereof obtained by phosgenation of aniline-formaldehyde condensates and crude toluene diisocyanates obtained by phosgenation of a mixture of toluene diamines.

Water is used as the primary blowing agent for most flexible, semi-flexible and high-resilience foams. Water reacts with the polyisocyanate to produce carbon dioxide which provides the desired expansion and cell formation and urea linkages which are an added source of active hydrogen in the reaction system. The amount of water used preferably is within the range of about 2 to about 5, most preferably about 2.5 to 5, parts by weight per 100 parts of the active hydrogen-containing organic compound. The density can be reduced by increasing the amount of water and polyisocyanate; however, the hardness of the foam usually will not be reduced. When lower density and soft foams are desired, a conventional organic blowing agent can be added as an auxiliary blowing agent. For rigid foams where good insulating properties are desired, auxiliary blowing agents are also used.

Suitable auxiliary blowing agents include low boiling-point liquids which vaporize at the exothermic reaction temperature of the reaction mixture, e.g., have boiling points less than 100° C., and are inert with respect to the polyisocyanates. Representative examples of such liquids include low boiling hydrocarbons such as pentane, hexane, heptane, pentene, and heptene and halogenated hydrocarbons such as methylene chloride, ethylene chloride, vinylidene chloride, trichloromonofluoromethane, dichlorodifluoromethane, dichloromonofluoromethane, monochlorodifluoromethane, dichlorotetrafluoroethane, 1,1,2-trichloro-1,2,2-trifluoroethane, dibromofluoromethane, and monobromotrifluoromethane. Mixtures of these liquids can be used. Fluorocarbons are particularly useful for use in rigid foams, since they exhibit good insulating performance.

The catalyst employed can be any conventional catalyst known to catalyze the isocyanate reaction and usually consists of tertiary amines, organo metallic compounds, or mixtures thereof. Suitable tertiary amines include triethylenediamine, triethylamine, triethanolamine, N-ethylmorpholine, N,N-dimethyl cyclohexylamine, N-methyl dicyclohexylamine, N,N-dimethylbenzylamine, bis(dimethyl amino ethyl) ether, bis(dimethylamino propyl) ether, tetramethyl-1,3-butanediamine, and the like.

Suitable organo metallic catalysts include tin acylates, such as stannous octoate, tin compounds, such as stannous chloride, and tin salts of carboxylic acids, such as dibutyltin-di-2-ethyl hexoate.

The total amount of catalysts employed is usually within the range of about 0.02 to about 3, preferably about 0.05 to about 1.5, parts by weight per 100 parts of the active hydrogen-containing organic compound. The tertiary amine catalysts are usually employed in amounts ranging from about 0.1 to about 1 part by weight per 100 parts of the active hydrogen-containing organic compound and the organo metallic catalysts are usually employed in amounts ranging from about 0.02 to about 0.5 parts by weight per 100 parts of the active hydrogen-containing organic compound. As is well known, mixtures of tertiary amine and organo metallic catalysts are used for various types of foams.

When harder foams are desired, a conventional cross-linking agent can be added to the reaction system. Suitable cross-linking agents include triethanolamine, triisopropylamine, N,N,N',N'-tetrakis-(2-hydroxypropyl)-ethylene diamine, lower molecular weight 1,2-alkylene oxide adducts of trimethylol propane, glycerol, pentaerythritol, sorbitol and the like. Amylaceous materials appear to act as a cross-linking agent in the reaction system. Accordingly, cross-linking agents commonly used in prior art processes for making relatively stiff or "dead" semi-flexible foam used as crash pads usually are not required, particularly when higher amounts of an amylaceous material are used and/or high stiffness is not desired. The presence of cross-linking agents in prior art foam formulations usually meant that an isocyanate index of less than 100 must be used in order to obtain an open cell structure. One of the advantages of the invention is that all or some of the cross-linking agent can be replaced by the amylaceous material which means that an isocyanate index of 100 or higher can be used and still obtain an open cell structure.

While not absolutely necessary in many cases, conventional surfactants can be employed to minimize foam collapse, particularly at the mold edges, and to enhance more uniform cell size. Suitable surfactants include well known siloxane-oxyalkylene copolymers and other organopolysiloxane fluids, oxyethylated alkylphenols, oxyethylated fatty alcohols and polyoxyalkylene block copolymers. When used, the amount of the surfactant usually is about 0.1 to about 2 parts by weight per 100 parts of the active hydrogen-containing organic compound.

Since amylaceous materials generally are biodegradable, it may be desirable to add a small amount of a suitable mildewcide for some applications. Suitable mildewcides include derivatives of mercury, arsenic and tin, such as tributyltin salicylate (e.g., Cotin 234, marketed by Cosan Corp.) and 10,10'-oxybis-phenoxyarsine (e.g., Vinyzene BP-5-2-DOP, marketed by Ventron Corp.). When used, the amount of mildewcide is usually about 0.03 to about 3 parts per 100 parts of the amylaceous material.

If desired, various suitable fillers, dyes, and pigments, such as carbon black, can be incorporated into the foam-forming reaction mixture.

The use of stabilized amylaceous materials in polyurethane foams provide several advantages. First, amylaceous materials generally are considerably less costly than conventional polyols. Consequently, the cost of the starting materials can be substantially reduced. Second, semi-flexible foams containing an amylaceous material usually exhibit a higher modulus per unit density which means lesser amounts of the starting materials are required to produce foams having given shock-absorbing chracteristics. Third, it has been found that amylaceous materials are more efficient than graft copolymers normally used in high resilience foams with respect to the quantity of material required to impart given compression/deflection characteristics. Again, this means lesser amounts of starting materials can be used.

Without further elaboration, it is believed that one skilled in the art can, using the preceding description, utilize the present invention to its fullest extent. The following examples are presented to illustrate the invention and are not to be construed as limitations thereto.

EXAMPLE 1

Two flexible polyurethane foams were prepared with a conventional laboratory foam machine (Martin Sweet, MOD MOD 3A). One foam (Run 1) did not include an amylaceous material and the other foam (Run 2) included a pregelatinized corn flour which had been stored under atmospheric conditions for at least 12 months before being dried in an air-circulating oven at 110°–120° C. for at least 24 hours until a constant weight was obtained. The formulation and foaming conditions employed were as follows:

| Premixed Polyol Stream, parts by weight | Run 1 | Run 2 |
|---|---|---|
| Polyol[1] | 100.0 | 100.0 |
| Water | 4.5 | 4.5 |
| Silicone surfactant[2] | 1.0 | — |
| Silicone surfactant[3] | — | 1.0 |
| 2-dimethylamino ether[4] (in dipropylene glycol solution) | 0.09 | 0.2 |
| Stannous octoate[5] | 0.225 | — |
| Corn flour | 13 | 41.3 |
| Fluorocarbon blowing agent[6] | 4.0 | 4.0 |
| | 109.815 | 151.0 |
| Isocyanate Stream, parts by weight | | |
| Toluene diisocyanate[7] | 59.0 | 55.3 |
| Mixing Ratio | | |
| Polyol Stream: Isocyanate Stream, at about 30° C. | 100:53.7 | 100:36.6 |

Notes:
[1]VORANOL 3140, marketed by Dow Chemical Co., a block copolymer of glycerol, propylene oxide and ethylene oxide having a hydroxyl number of 45.5
[2]SILICONE DC-196, marketed by Dow Corning Corporation, a polysiloxane-polyoxyalkylene silicone block copolymer surfactant
[3]SILICONE DC-198, marketed by Dow Corning Corporation, a polysiloxane-polyoxyalkylene silicone block copolymer surfactant
[4]NIAX A-1, marketed by Union Carbide Corp., a 70% solution of bis(dimethylamino ethyl) ether in dipropylene glycol
[5]T-9, marketed by M&T Chemicals, Inc.
[6]Freon 11B, marketed by DuPont, trichloromonomethane stabilized with alloocimene
[7]MONDUR TD-80, marketed by Mobay Chemical Corp., an 80/20 mixture of 2,4- and 2,6-toluene diisocyanates The resultant reaction mixtures were poured into 1-quart, polyethylene-lined, paper ice cream cups. The foam from Run 1 had a cream time of 14 seconds and a rise time of 95 seconds and the foam from Run 2 had a cream time of 21 seconds and a rise time of 260 seconds. The product from Run 1 had good initial tensile strength. The product from Run 2 stopped rising shorter than normal, had many coarse cells, had practically no strength and crumbled upon compression.

EXAMPLE 2

Foam buns, 3 feet long, 2 feet wide and 2 feet high, were prepared from the reaction mixtures of Example 1. The foams were cured for about one week under atmospheric conditions. The following physical properties of the foam from Run 1 were determined by standard ASTM procedures: Density=1.36 lb/ft$^3$, tear strength=1.32 pli, tensile strength=15.5 psi, elongation=172%, compression set (24 hrs. at 70° C. and 90% compression)=13.1%. The foam from Run 2 rose only to about ½ of the expected volume, cured extremely slowly, and could not be tested for physical properties because it disintegrated upon touching.

EXAMPLE 3

Two amylaceous materials, (1) a gelatinized corn flour prepared by an extrusion-cooking process and (2) an unmodified corn four, were dried in an air-circulating oven at 110°–120° C. until a constant weight was obtained, i.e., for about 48 hours. A portion of each flour was dried without stabilization and another portion was stabilized before drying. The stabilizing agent used was a mixture of dilaurylthiodipropionate (A) and thiodiethylene bis-(3,5-di-tert-butyl-4-hydroxy) hydrocinnamate (B), both dissolved in methylethyl ketone. The starch was introduced into a conventional blender and the mixer was operated at a low or medium speed setting while amounts of the solutions equivalent to 0.3 weight % of (A) and 0.1 weight % of (B), based on the weight of the amylaceous material, were slowly added to the blender.

The dried flours, both stabilized and unstabilized, were included as ingredients in flexible polyurethane foams having the following formulation:

| Ingredient | Parts by Weight |
|---|---|
| Polyol[1] | 100.0 |
| Water | 4.5 |
| Silicone surfactant[8] | 1.0 |
| bis(2-dimethylaminoethyl) ether[4] | 0.1 |
| Stannous octoate[5] | 0.3 |
| Corn flour | 41.3 |
| Fluorocarbon blowing agent[6] | 4.0 |
| Toluene diisocyanate[7] | 57.3 |

Notes:
[1] through [7] See Example 1
[8]L-550, marketed by Union Carbide Corp., a polyoxyalkylene-polysiloxane surfactant All of the ingredients, except the isocyanate, were added to 1-pint, polyethylene-lined, paper ice cream cups. The auxiliary blowing agent and the catalyst were added last. This mixture was stirred for a short time after the addition of each ingredient and then for about 3–5 minutes after all the ingredients had been added to insure a thorough dispersion. After the isocyanate was added, the resultant reaction mixtures were stirred for a few seconds and then transferred to 1-quart, polyethylene-lined paper ice cream cups for foaming. The cream and rise times and the densities were measured and the physical appearance of the foams were observed. The results are summarized in Table I.

From these results, it can be seen that polyurethane foams containing an amylaceous material stabilized with a stabilizing agent in accordance with one aspect of the invention had good foam structure and strength characteristics while foams made from the same ingredients, except for the amylaceous material being unstabilized, had poor foaming characteristics and physical properties. While not completely understood at this time, this difference apparently is caused by the presence of oxidation products in the amylaceous material which are deleterious to the foam-forming reaction.

EXAMPLE 4

Several high resilience polyurethane hand foams were prepared wherein a graft polyether normally used in high resilience foams to impart high tensile and tear strength characteristics was replaced by three different amylaceous materials, (1) a pregelatinized corn flour prepared by an extrusion-cooking process, (2) a dry milled corn flour, and (3) an acid hydrolyzed, pregelatinized corn flour prepared by acid hydrolyzing a corn flour and then gelatinizing by an extrusion-cooking process. A portion of each flour was dried without stabilization and another portion was dried after treatment with a stabilizing agent in the same manner as in Example 3 except the stabilizing agent consisted of a mixture of dilaurylthiodipropionate, 0.3 weight % of the flour, and tetrakis [methylene (3,5-di-tert-butyl-4- hydroxy cinnamate)] methane (Irganox 1010 marketed by Ciba-Geigy), 0.1 weight % of the flour. The following formulations were used for each of the foams:

| Ingredient | Parts by Weight |
|---|---|
| Polyol[9] | 80.0 |
| Amylaceous material | 20.0 |
| Water | 2.8 |
| Silicone surfactant[10] | 1.0 |
| Tertiary amine catalyst[11] | 0.12 |
| Tertiary amine catalyst[12] | 0.8 |
| Dibutyltin diacylate[13] | 0.03 |
| Isocyanate[14] | 37.4 |

Notes:
[9] VORANOL 4701, marketed by Dow Chemical Co., a glycerol adduct of propylene oxide having outer blocks of ethylene oxide, a molecular weight of about 5000, anequivalent weight of about 1635, and a primary hydroxyl content of about 60%.
[10] L-5303, marketed by Union Carbide Corp., a polyoxyalkylene-polysiloxane block copolymer surfactant
[11] DABCO 33LV, marketed by Air Products Corp., 33% solution of triethylene diamine in dipropylene glycol
[12] NIAX ESN, marketed by Union Carbide Corp.,
[13] CARSTAN T-52-N-50, marketed by Cincinnati Milacron Chemicals, Inc., a solution of adibutyltin diacylate in a plasticizer
[14] A mixture consisting of 80 wt. % of MONDUR TD80, marketed by Mobay Chemical Co., a80-20 mixture of 2,4- and 2,6-toluene diisocyanates, and 20 wt. % of ISONATE 580,marketed by The Upjohn Co., crude diphenylmethane diisocyanate.

The hand foams were prepared in the same general manner as described in Example 3. The cure characteristics of the foam were observed and the physical properties were measured by standard ASTM procedures. The results are summarized in Table II.

From these results, it can be seen that high resilience polyurethane foams containing various amylaceous materials stabilized in accordance with one aspect of the invention had excellent physical properties whereas those containing an unstabilized amylaceous material, in the same amount, either collapsed during foaming or exhibited higher density and compression set.

EXAMPLE 5

Flexible hand foams were prepared in the manner described in Example 3 using the formulations in Example 1. An unstabilized pregelatinized corn flour was used in one run.

The foam containing no corn flour behaved normally, had a free blow density of about 1.75 lb/ft$^3$, and had good strength characteristics. On the other hand, the foam containing the unstabilized corn flour rose considerably slower, had a much higher density, and had poor strength characteristics.

A 100 g sample of the pregelatinized corn flour was digested at room temperature with 300 g of isopropanol for a period of 30 minutes. The corn flour was filtered from the solvent and dried to a constant weight in a vacuum oven at 60°–70° C. A hand foam having the same formulation was prepared by the thus-stabilized corn flour.

The foam behaved normally, exhibiting a cream time of 12 seconds and a rise time of 165 seconds. After curing, the foam product had a density of 2.1 lb/ft$^3$ and had good strength characteristics. The solvent extraction treatment of the corn flour evidently removed impurities, most likely oxidized fats, which interfere with the foam-forming reaction.

From the foregoing description, one skilled in the art can easily ascertain the essential characteristics of the invention and, without departing from the spirit and scope thereof, can make various changes and modifications to adapt the invention to various usages and conditions.

TABLE I

| FOAMING AND PHYSICAL CHARACTERISTICS - EXAMPLE 3 FOAMS | | | | |
|---|---|---|---|---|
| | Gelatinized Corn Flour | | Corn Flour | |
| | Stab. | Unstab. | Stab. | Unstab. |
| FOAMING CHARACTERISTICS: | | | | |
| Cream Time, sec. | 8 | 8 | 7 | 8 |
| Rise Time, sec. | 150 | 200 | 126 | 192 |
| PHYSICAL CHARACTERISTICS: | | | | |
| Amylaceous Material Content, wt. % | 20 | 20 | 20 | 20 |
| Density, lb/ft$^3$ | 2.14 | 3.00 | 2.35 | 2.67 |
| Observations | Good foam structure and tensile strength | Splits, tears easily | Good foam structure and tensile strength | Splits, partial foam collapse |

TABLE II

| CURING CHARACTERISTICS AND PHYSICAL PROPERTIES - EXAMPLE 4 FOAMS | | | | | | |
|---|---|---|---|---|---|---|
| | Gelatinized Corn Flour | | Corn Flour | | Acid-Hydrolyzed, Gelatinized Corn Flour | |
| | Stab. | Unstab. | Stab. | Unstab. | Stab. | Unstab. |
| CURE: | | | | | | |
| Cream Time, sec. | 15 | 15 | 10 | 10 | 13 | 15 |
| Oven Cure at 100°–110° C. hrs. | 2 | 2 | 2 | 2 | 2 | 2 |
| PHYSICAL PROPERTIES: | | | | | | |
| Amylaceous Material Content wt.% | 14 | 14 | 14 | 14 | 14 | 14 |
| Density, g/cm$^3$ | 0.0386 | Coll.[1] | 0.0399 | 0.0433 | 0.0398 | Coll.[1] |
| Density, lb/ft$^3$ | 2.41 | — | 2.49 | 2.70 | 2.48 | — |
| Compression Set, % (22 hrs. at 70° C., 90% compression) | 13.0 | 10.2 | 8.6 | 10.4 | 10.7 | 8.9 |

TABLE II-continued
CURING CHARACTERISTICS AND PHYSICAL PROPERTIES - EXAMPLE 4 FOAMS

| | Gelatinized Corn Flour | | Corn Flour | | Acid-Hydrolyzed, Gelatinized Corn Flour | |
| --- | --- | --- | --- | --- | --- | --- |
| | Stab. | Unstab. | Stab. | Unstab. | Stab. | Unstab. |
| Resilience, % | 47.2 | — | 41.7 | 48.6 | 50.0 | — |

Notes:
[1]Sample collapsed during foaming

I claim:

1. In a process for preparing a polyurethane foam wherein an active hydrogen-containing organic compound is reacted with an organic polyisocyanate in the presence of a blowing agent to form a foam-forming reaction system, the improvement comprising
adding to the reaction mixture as an ingredient thereof about 5 to about 90 parts by weight of a stabilized amylaceous material per 100 parts of the active hydrogen-containing organic compound, said amylaceous material being prepared by (a) admixing therewith a stabilizing agent including an effective amount of an antioxidant capable of inhibiting the formation of oxidation products in said amylaceous material upon exposure to an oxidizing atmosphere or (b) removing substantially all of the oxidizable and/or oxidized materials from said amylaceous material.

2. A process according to claim 1 including the step of reducing the moisture content of said stabilized amylaceous material to less than about 1 weight % prior to addition to the reaction mixture.

3. A process according to claim 2 wherein said stabilized amylaceous material is dried to a constant weight.

4. A process according to claim 1 wherein said stabilizing agent includes a free radical scavenger primary antioxidant.

5. A process according to claim 4 wherein said stabilizing agent further includes a secondary antioxidant capable of decomposing oxidation products in said amylaceous material.

6. A process according to claim 4 wherein said primary antioxidant is selected from the group consisting of phenolic antioxidants, secondary amine antioxidants, gum guaiac, ethoxyguin, and mixtures thereof.

7. A process according to claim 5 wherein said secondary antioxidant is selected from the group consisting of alkylated aryl phosphites, esters of thiopropionic acids, thiocarbamates, dithiocarbamates and mixtures thereof.

8. A process according to claim 6 wherein said phenolic antioxidants is a hindered phenolic or a polyhydroxy phenolic antioxidant.

9. A process according to claim 6 wherein said secondary amine antioxidant is a diphenylamine, a phenylenediamine, an alkylenediamine, or a naphthylamine antioxidant.

10. A process according to claim 1 wherein a sufficient amount of said stabilizing agent is admixed with said amylaceous material to add thereto about 0.03 to about 0.6 weight % of said antioxidant, based on the weight of said amylaceous material.

11. A process according to claim 1 wherein the oxidizable and/or oxidized materials are removed from said amylaceous material by solvent extraction.

12. A process according to claim 1 wherein said active hydrogen-containing organic compound is a polyether or a polyhydroxyl-containing polyester.

13. A process according to claim 1 wherein said amylaceous material is a starch-bearing product of corn, rice, wheat, barley, sorghum, potato or tapioca.

14. A process according to claim 13 wherein said starch-bearing product is a pregelatinized cereal starch or flour.

15. A process according to claim 14 wherein said cereal starch or flour is a corn starch or flour.

16. A polyurethane foam prepared by the process of claim 1.

17. In a process for preparing a polyurethane foam wherein a polyol selected from the group consisting of polyethers, a polyhydroxyl-containing polyesters and mixtures thereof is reacted with an organic polyisocyanate in the presence of a blowing agent to form a foam-forming reaction system, the improvement comprising
adding to the reaction mixture as an ingredient thereof about 5 to about 90 parts by weight of a stabilized amylaceous material per 100 parts of the polyol, said amylaceous material being prepared by (a) admixing therewith a stabilizing agent including an effective amount of a free radical scavenger anti-oxidant capable of inhibiting the formation of oxidation products in said amylaceous material upon exposure to an oxidizing atmosphere or (b) removing substantially all of the oxidizable and/or oxidized material from said amylaceous material by solvent extraction and then being dried to moisture content of less than about 1 weight %.

18. A process according to claim 17 wherein said amylaceous material is a starch-bearing product of corn, rice, wheat, barley, sorghum, potato or tapioca.

19. A process according to claim 18 wherein
said stabilizing agent further includes a secondary antioxidant capable of decomposing oxidation products in said amylaceous material selected from the group consisting of alkylated aryl phosphites, esters of thiopropionic acids, thiocarbamates, dithiocarbamates; and
said primary antioxidant is selected from the group consisting of phenolic antioxidants, secondary amine antioxidants, gum guaiac, ethyoxyguin, and mixtures thereof.

20. A process according to claim 19 wherein a sufficient amount of said stabilizing agent is admixed with said amylaceous material to add thereto about 0.03 to about 0.6 weight % of said antioxidants, based on the weight of said amylaceous material.

21. A process according to claim 19 wherein said starch-bearing product is a pregelatinized corn starch or flour.

22. A polyurethane foam prepared by the process of claim 17.

* * * * *